United States Patent
Dar et al.

(10) Patent No.: US 12,437,065 B2
(45) Date of Patent: Oct. 7, 2025

(54) SYSTEM AND METHOD FOR TARGETED MACHINE LEARNING-BASED DETECTION AND PREVENTION OF RANSOMWARE ATTACKS ON A STORAGE SYSTEM

(71) Applicant: Dell Products L.P., Round Rock, TX (US)

(72) Inventors: Shaul Dar, Petach Tikva (IL); Ramakanth Kanagovi, Bengaluru (IN); Guhesh Swaminathan, Tamil Nadu (IN); Rajan Kumar, Nawada (IN); Sanjib Mallick, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/311,341

(22) Filed: May 3, 2023

(65) Prior Publication Data
US 2024/0370557 A1   Nov. 7, 2024

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01); *G06F 2221/034* (2013.01)

(58) Field of Classification Search
CPC ........ G06F 21/50; G06F 21/55; G06F 21/552; G06F 21/554; G06F 21/556; G06F 21/56; G06F 21/561; G06F 21/562; G06F 21/563; G06F 21/564; G06F 21/565; G06F 21/566; G06F 21/567; G06F 21/568; G06F 2221/034
See application file for complete search history.

(56) References Cited

U.S. PATENT DOCUMENTS

| | | | |
|---|---|---|---|
| 12,197,578 B1 * | 1/2025 | Brandwine | G06F 21/554 |
| 2018/0293176 A1 * | 10/2018 | Borlick | G06F 21/55 |
| 2020/0092335 A1 * | 3/2020 | Brooks | G06F 9/542 |
| 2022/0360594 A1 * | 11/2022 | Cosgrove | H04L 63/1416 |
| 2022/0391506 A1 * | 12/2022 | Gupta | G06F 21/566 |
| 2023/0229764 A1 * | 7/2023 | Vohra | G06F 21/568 |

* cited by examiner

*Primary Examiner* — Malcolm Cribbs
(74) *Attorney, Agent, or Firm* — Brian J. Colandreo; Heath M. Sargeant; Holland & Knight LLP

(57) ABSTRACT

A method, computer program product, and computing system for monitoring for a potential ransomware attack on a storage object of a storage system based upon, at least in part, processing of a plurality of input/output (IO) features associated with the storage object using a machine learning model. A host computing device associated with the storage object under the potential ransomware attack is identified. A process executing on the host computing device associated with the storage object under the potential ransomware attack is identified. A remedial action is performed on the storage system in response to identifying the process executing on the host computing device.

20 Claims, 6 Drawing Sheets

SYSTEM AND METHOD FOR TARGETED MACHINE LEARNING-BASED DETECTION AND PREVENTION OF RANSOMWARE ATTACKS ON A STORAGE SYSTEM

BACKGROUND

Ransomware attacks are a primary security threat in today's world and are becoming more and more prevalent. Accurate detection is crucial, since a false negative is a failure to detect an ongoing ransomware attack, while a false positive indicates a false alarm which may cause users of a storage system to halt normal business operations and start a lengthy investigation process. There are different ransomware variants utilizing particular modes of operation (threats, tactics and procedures) which makes detecting a ransomware attack in general (i.e., a binary classification) more challenging, and detection of a specific type of attack (i.e., multi-class classification) even more challenging. Conventional approaches are focused on detection of ransomware attacks on a host, where the attack is occurring (i.e., where the ransomware is being executed). However, in an enterprise setting, the storage is typically separate from the host, using a file or block storage device or storage system. Detection of ransomware attacks on the storage system as opposed to the host poses a unique challenge since the storage system does not have direct access to information about the execution of the ransomware attack. Furthermore, host-level systems are generally unaware of storage object-level ransomware attacks making prevention of these attacks difficult.

SUMMARY OF DISCLOSURE

In one example implementation, a computer-implemented method executed on a computing device may include, but is not limited to, monitoring for a potential ransomware attack on a storage object of a storage system based upon, at least in part, processing of a plurality of input/output (IO) features associated with the storage object using a machine learning model. A host computing device associated with the storage object under the potential ransomware attack is identified. A process executing on the host computing device associated with the storage object under the potential ransomware attack is identified. A remedial action is performed on the storage system in response to identifying the process executing on the host computing device.

One or more of the following example features may be included. Monitoring for the potential ransomware attack on the storage object may include processing a plurality of IO requests associated with a plurality of storage objects of the storage system. Monitoring for the potential ransomware attack on the storage object may include generating the plurality of IO features using the plurality of IO requests. Identifying the process executing on the host computing device may include identifying a user associated with the process executing on the host computing device. identifying the process executing on the host computing device may include: determining when a plurality of processes began executing on the host computing device; determining a storage object access history for the identified process; and determining permissions associated with the user. Performing the remedial action may include blocking the identified process from accessing the storage object. Performing the remedial action may include alerting one or more users concerning the monitored potential ransomware attack and the identified process.

In another example implementation, a computer program product resides on a computer readable medium that has a plurality of instructions stored on it. When executed by a processor, the instructions cause the processor to perform operations that may include, but are not limited to, monitoring for a potential ransomware attack on a storage object of a storage system based upon, at least in part, processing of a plurality of input/output (IO) features associated with the storage object using a machine learning model. A host computing device associated with the storage object under the potential ransomware attack is identified. A process executing on the host computing device associated with the storage object under the potential ransomware attack is identified. A remedial action is performed on the storage system in response to identifying the process executing on the host computing device.

One or more of the following example features may be included. Monitoring for the potential ransomware attack on the storage object may include processing a plurality of IO requests associated with a plurality of storage objects of the storage system. Monitoring for the potential ransomware attack on the storage object may include generating the plurality of IO features using the plurality of IO requests. Identifying the process executing on the host computing device may include identifying a user associated with the process executing on the host computing device. identifying the process executing on the host computing device may include: determining when a plurality of processes began executing on the host computing device; determining a storage object access history for the identified process; and determining permissions associated with the user. Performing the remedial action may include blocking the identified process from accessing the storage object. Performing the remedial action may include alerting one or more users concerning the monitored potential ransomware attack and the identified process.

In another example implementation, a computing system includes at least one processor and at least one memory architecture coupled with the at least one processor, wherein the at least one processor is configured to monitoring for a potential ransomware attack on a storage object of a storage system based upon, at least in part, processing of a plurality of input/output (IO) features associated with the storage object using a machine learning model. A host computing device associated with the storage object under the potential ransomware attack is identified. A process executing on the host computing device associated with the storage object under the potential ransomware attack is identified. A remedial action is performed on the storage system in response to identifying the process executing on the host computing device.

One or more of the following example features may be included. Monitoring for the potential ransomware attack on the storage object may include processing a plurality of IO requests associated with a plurality of storage objects of the storage system. Monitoring for the potential ransomware attack on the storage object may include generating the plurality of IO features using the plurality of IO requests. Identifying the process executing on the host computing device may include identifying a user associated with the process executing on the host computing device. identifying the process executing on the host computing device may include: determining when a plurality of processes began executing on the host computing device; determining a storage object access history for the identified process; and determining permissions associated with the user. Performing the remedial action may include blocking the identified process from accessing the storage object. Performing the remedial action may include alerting one or more users concerning the monitored potential ransomware attack and the identified process.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
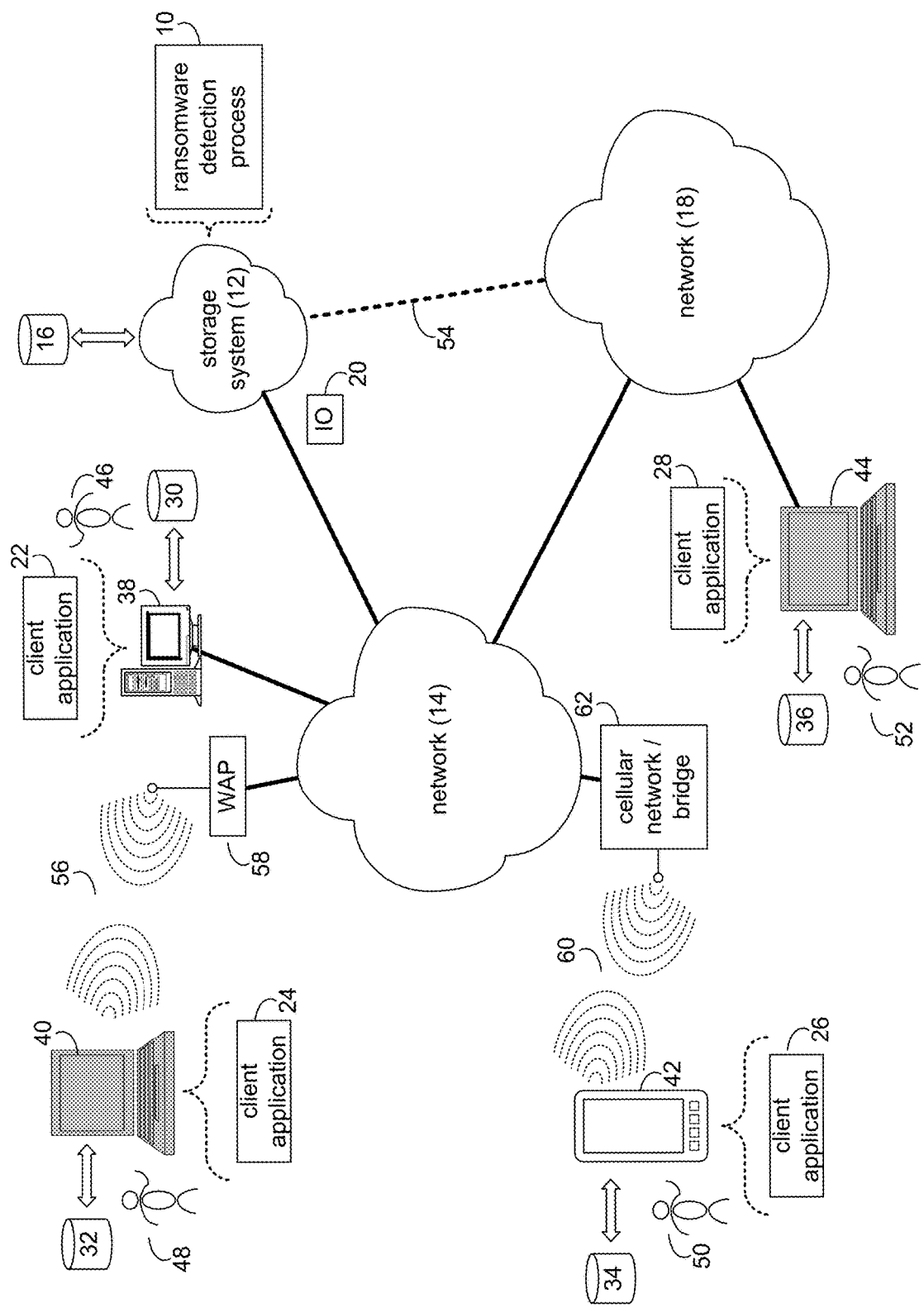
FIG. 1 is an example diagrammatic view of a storage system and a ransomware detection process coupled to a distributed computing network according to one or more example implementations of the disclosure.

Referring to FIG. 1, there is shown ransomware detection process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of ransomware detection process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of ransomware detection process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a ransomware detection process, such as ransomware detection process 10 of FIG. 1, may include but is not limited to, monitoring for a potential ransomware attack on a storage object of a storage system based upon, at least in part, processing of a plurality of input/output (IO) features associated with the storage object using a machine learning model. A host computing device associated with the storage object under the potential ransomware attack is identified. A process executing on the host computing device associated with the storage object under the potential ransomware attack is identified. A remedial action is performed on the storage system in response to identifying the process executing on the host computing device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
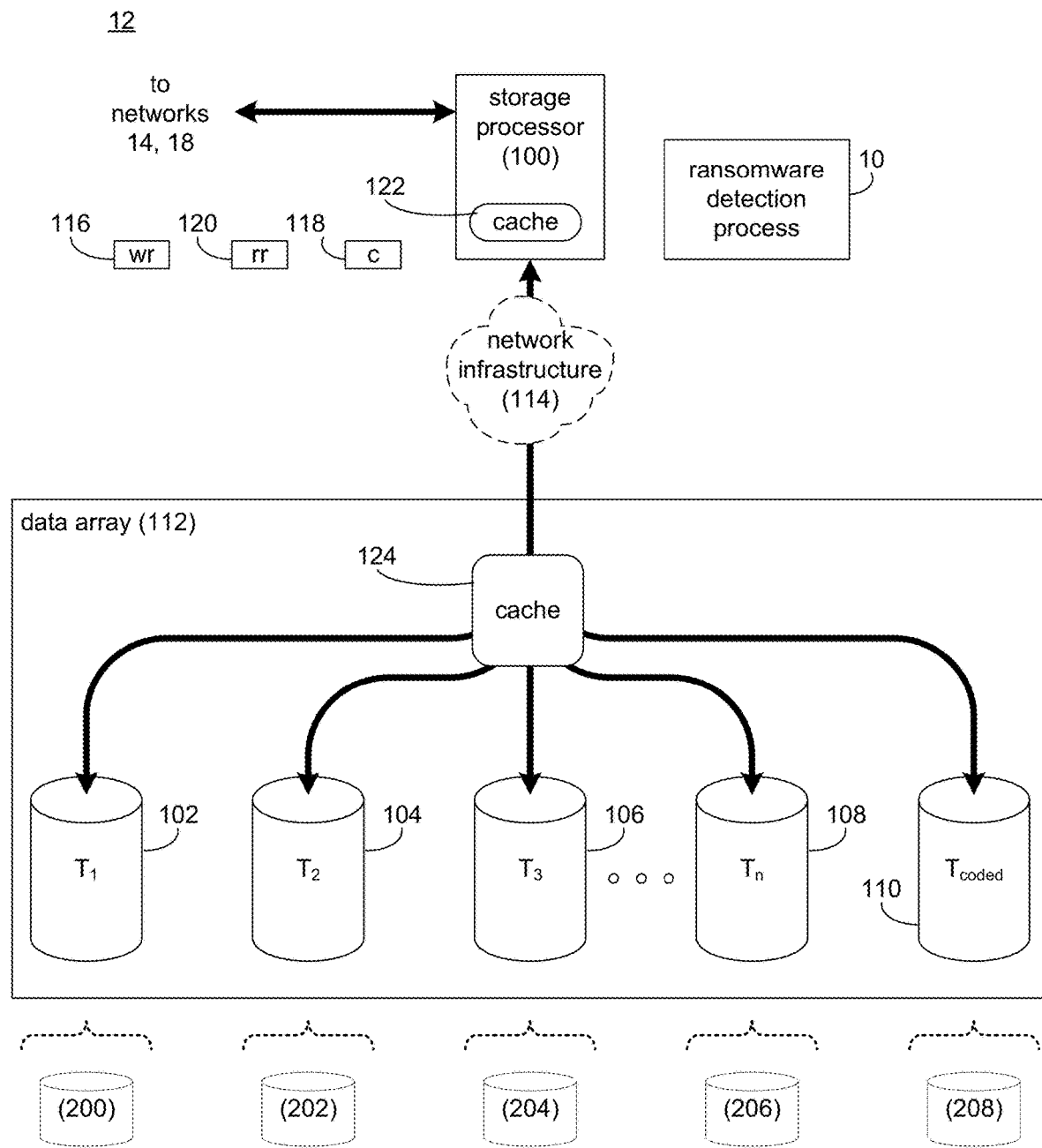
FIG. 2 is an example diagrammatic view of the storage system of FIG. 1 according to one or more example implementations of the disclosure.
Figure 3:
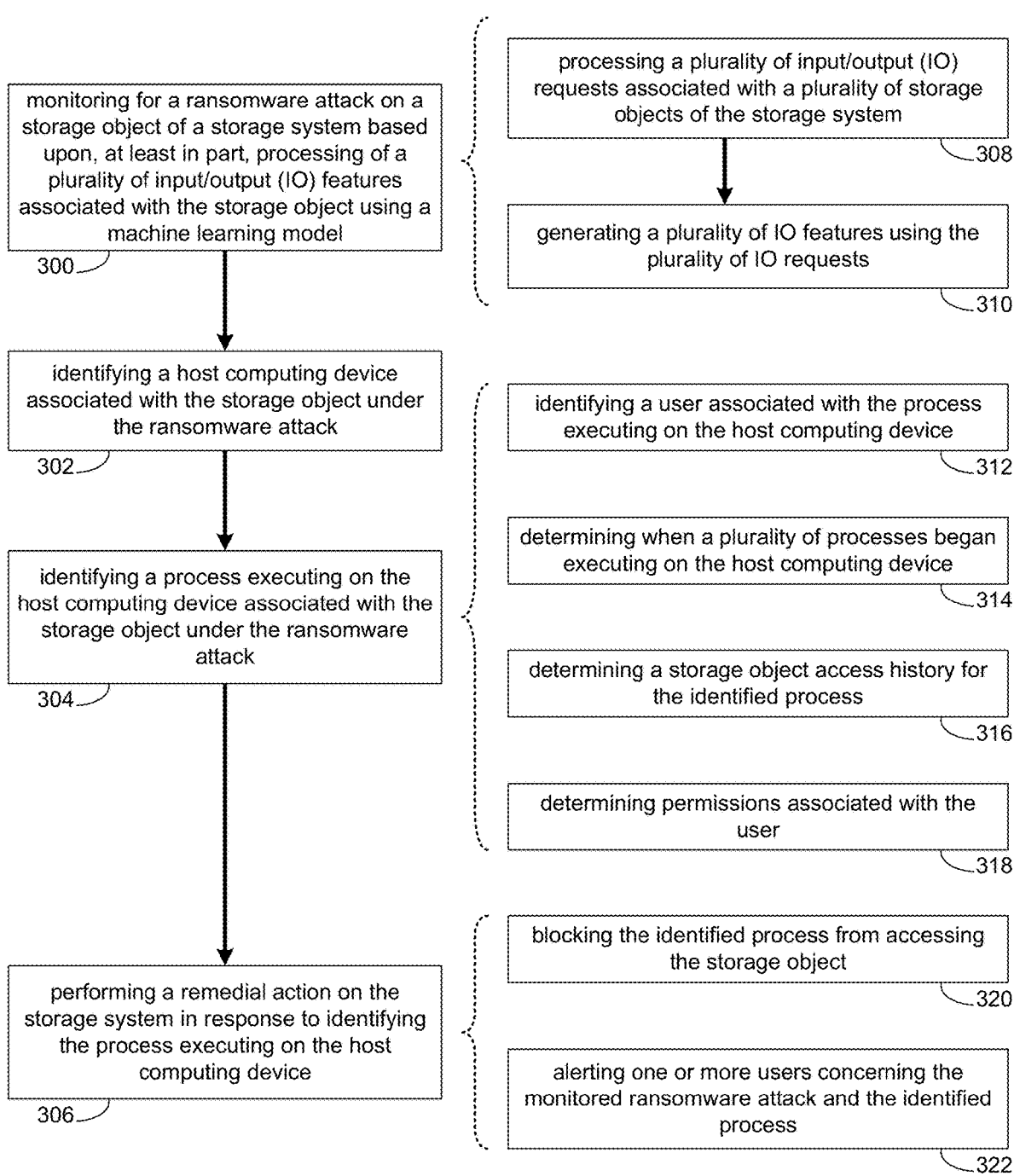
FIG. 3 is an example flowchart of ransomware detection process according to one or more example implementations of the disclosure.

The Storage System:

Referring also to FIG. 2, storage system 12 may include storage processor 100 and a plurality of storage targets T1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of ransomware detection process 10. The instruction sets and subroutines of ransomware detection process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of ransomware detection process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12). During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of ransomware detection process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of ransomware detection process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Ransomware Detection Process:

Referring also to the examples of FIGS. 3-6 and in some implementations, ransomware detection process 10 may monitor 300 for a potential ransomware attack on a storage object of a storage system based upon, at least in part, processing of a plurality of input/output (IO) features associated with the storage object using a machine learning model. A host computing device associated with the storage object under the potential ransomware attack is identified 302. A process executing on the host computing device associated with the storage object under the potential ransomware attack is identified 304. A remedial action is performed 306 on the storage system in response to identifying the process executing on the host computing device.

As will be discussed in greater detail below, implementations of the present disclosure may allow for real-time or near real-time monitoring, detection, and prevention of ransomware attacks on a storage system. Ransomware attacks are a primary security threat in today's world and are becoming more and more prevalent. Accurate detection is crucial, since a false negative is a failure to detect an ongoing ransomware attack, while a false positive indicates a false alarm which may cause users of a storage system to halt normal business operations and start a lengthy investigation process. Early detection is important, as it provides the opportunity to automatically or manually (e.g., by alerting a user) block the ransomware attack before it has caused most of its damage, and to recover from the attack using valid copies of the compromised data, such as snapshots or replicas. There are different ransomware variants utilizing particular modes of operation (threats, tactics and procedures) which makes detecting a ransomware attack in general (i.e., a binary classification) more challenging, and detection of a specific type of attack (i.e., multi-class classification) even more challenging. Conventional approaches are focused on detection of ransomware attacks on a host, where the attack is occurring (i.e., where the ransomware is being executed). However, in an enterprise setting, the storage is typically separate from the host, using a file or block storage device or storage system. Detection of ransomware attacks on the storage system as opposed to the host poses a unique challenge since the storage system does not have direct access to information about the execution of the ransomware attack. Furthermore, host-level systems are generally unaware of storage object-level ransomware attacks making prevention of these attacks difficult.

As will be discussed in greater detail below, implementations of the present disclosure allow the source of a ransomware attack to be identified, allow for evidence gathering to support or verify classification of the ransomware attack, and to perform remedial actions preventing or limiting the impact of the ransomware attack. As such, implementations of the present disclosure: 1) detect a potential ransomware attack on a storage system; 2) correlate each storage object under attack with the host computing device from which the IO requests originate; 3) correlate each storage object under attack with the specific process executing on host computing device from which the IO requests originate; 4) identify an associated executable file and user related to the suspected process; 5) conducting evidence gathering concerning the ransomware attack; and 6) perform remedial actions (e.g., blocking access to portions of the storage system and/or alerting users concerning the ransomware attack).

In some implementations, ransomware detection process 10 processes 308 a plurality of input/output (IO) requests associated with a plurality of storage objects of a storage system. For example and referring again to FIG. 2, during the operation of a storage system (e.g., storage system 12), IO operations may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g., by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure. As will be discussed in greater detail below, ransomware detection process 10 is able to detect a ransomware attack by generating IO features for block storage objects and/or file storage objects.

Figure 4:
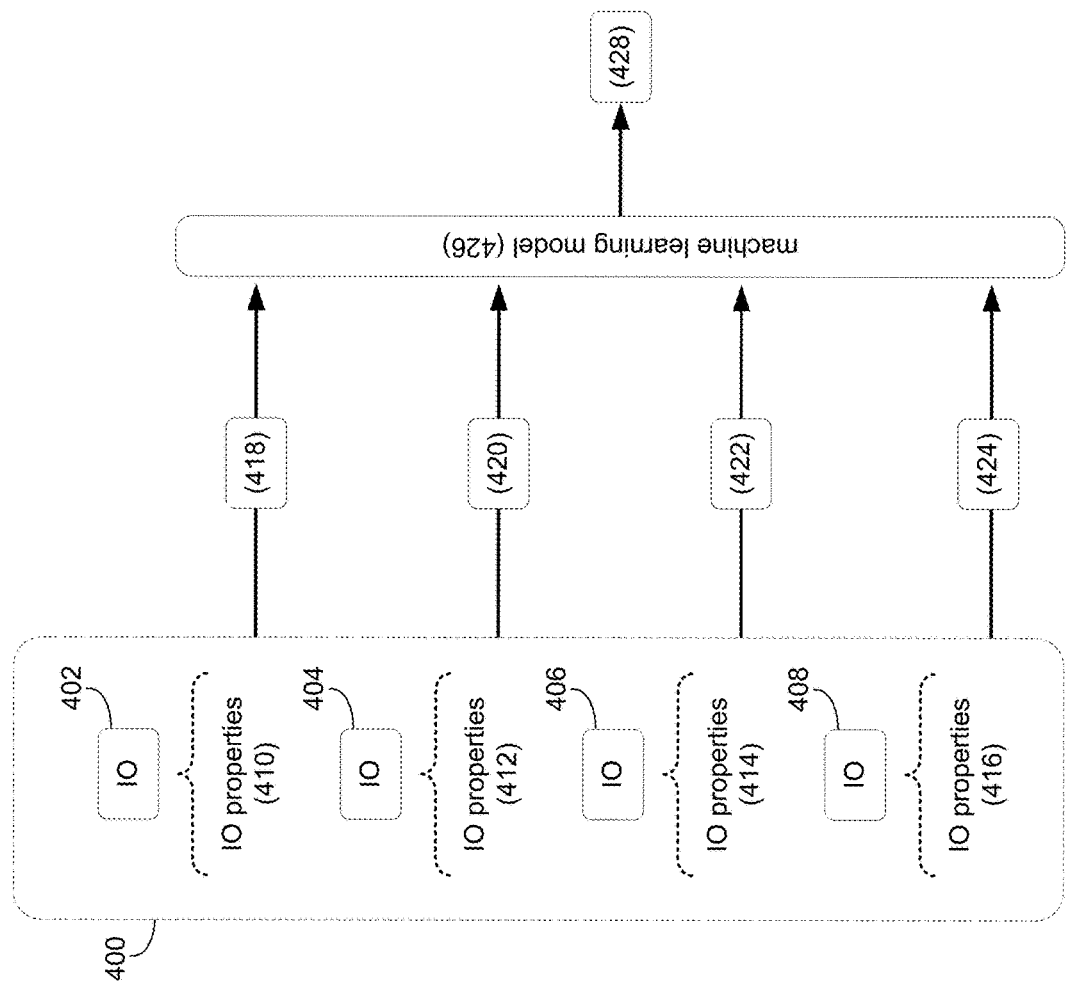
FIG. 4 is an example diagrammatic view of the ransomware detection process according to one or more example implementations of the disclosure.

Referring also to FIG. 4, a plurality of IO requests (e.g., plurality of IO requests 400) may include e.g., four IO requests associated with various storage objects and/or the same storage object. IO request 402 may include a request to perform a read IO operation on a first storage object (e.g., storage object 200); IO request 404 may include a request to perform a write IO operation on storage object 200; IO request 406 may include a request to perform a read IO operation on storage object 200; and IO request 408 may include a request to perform an operation on storage object 200. While four separate IO requests for a single storage object have been described, it will be appreciated that this is for example purposes only and that any number of IO requests may be received for any number of storage objects within the present disclosure.

In some implementations, ransomware detection process 10 generates 310 a plurality of IO features using the plurality of IO requests. An IO feature is a representation of a plurality of IO properties associated with a particular storage object over a period of time. In some implementations, an IO feature is used by a machine learning model to identify trends indicative of a ransomware attack involving the storage object. Examples of IO features include a number of IO requests per second (IOPS); a total number of read IO requests; a total number of write IO requests; a percentage of overwrite IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, ransomware detection process 10 generates 310 a plurality of IO features using the plurality of IO requests including one or more of: a percentage of overwrite IO requests, a percentage of sequential read IO requests, and a percentage of sequential write IO requests. For example, an overwrite IO request is the combination of as read IO request or operation followed by a write IO request or operation with the same logical address (e.g., LBA) and length. In this manner, the subsequent write operation overwrites the address range that was read, with no intervening IO operations on that address range. A sequential read IO request is identified by a second read IO operation of a pair of read operations such that the second read IO operation begins were the first read IO operation ended, (i.e., the LBA of second read IO operation equals the sum of the LBA of the first read IO operation plus the number of bytes read). A sequential write IO request is identified by a second write IO operation of a pair of write operations such that the second write IO operation begins were the first write IO operation ended, (i.e., the LBA of second write IO operation equals the sum of the LBA of the first write IO operation plus the number of bytes written).

In some implementations, there may be no intervening IO requests between the sequential IO operations. For example, suppose ransomware detection process 10 receives IO request 402 concerning a particular LBA range (e.g., either a read request or a write request) and IO request 404 concerns the next LBA range is received directly after IO request 402 such that no intervening IO requests are processed between IO requests 402 and 404. In another example, sequential IO requests may include a threshold amount of intervening IO requests and/or time between sequential IO requests. For instance, ransomware detection process 10 may receive a user-defined threshold for a number of intervening IO requests to define sequential IO requests. The threshold may be a default value (e.g., up to three intervening IO requests and/or three intervening IO requests that concern the same or a different LBA range). As such, it will be appreciated that various thresholds (e.g., number of IO requests, time between IO requests, range of LBAs, etc.) may be defined and used to identify sequential IO requests within the scope of the present disclosure.

As noted above, while IO features may be used by a machine learning model to identify trends indicative of a ransomware attack involving the storage object, the IO features of overwrite IO requests, sequential read IO requests, and sequential write IO requests are the most effective at accurately identifying trends indicative of a ransomware attack. For instance, in a ransomware attack, IO requests may be issued by ransomware malware to copy target data from the storage system and replace the target data with inaccessible or an encrypted version of data, until the victim pays a ransom fee to the attacker. As these ransomware processes include overwriting data, sequential reading data, and sequentially writing data in the manner described above, ransomware detection process 10 may generate 302 IO features concerning these suspect types of features from the plurality of IO requests.

In some implementations, ransomware detection process 10 generates 310 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, ransomware detection process 10 may extract various IO properties associated with the plurality of IO requests. Referring again to FIG. 4 and in some implementations, ransomware detection process 10 may extract one or more IO properties from plurality of IO requests 400. For example, ransomware detection process 10 may extract IO properties 418 from IO request 402; IO properties 420 from IO request 404; IO properties 422 from IO request 406; and IO properties 424 from IO request 408.

In some implementations, generating 310 the plurality of IO features using the plurality of IO requests includes aggregating the plurality of IO requests periodically, and generating the plurality of IO features using the aggregated plurality of IO requests. For example, ransomware detection process 10 may aggregate the one or more IO properties periodically to optimize for memory/storage requirements and/or CPU costs. Additionally, ransomware detection process 10 may use a sampling approach where IO properties for every "n"th IO request are extracted. In some implementations, the number of IO requests between extracting the one or more IO properties may be user-defined, a default number of IO requests, and/or defined automatically by ransomware detection process 10. In this manner, ransomware detection process 10 may limit the amount of processing of IO requests to generate IO features by sampling and aggregating a limited set of all of the IO requests received at the storage system. Referring again to FIG. 4 and in some implementations, ransomware detection process 10 may aggregate IO properties 410 from IO request 402; IO properties 412 from IO request 404; IO properties 414 from IO request 406; and IO properties 416 from IO request 408 and generate a plurality of IO features (e.g., IO features 418, 420, 422, 424).

In some implementations, ransomware detection process 10 processes the plurality of IO features using a machine learning model. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure. Ransomware detection process 10 may use any machine learning model or other machine learning algorithm to classify a plurality of IO features associated with a storage object as being indicative of a ransomware attack. In one example, a random-forest machine learning model may be used due to its generality, simplicity, tunability, and ability to cope with over-fitting. However, it will be appreciated that various machine learning models may be used within the scope of the present disclosure to process the plurality of IO features. Referring again to FIG. 4 and in some implementations, ransomware detection process 10 may process the plurality of IO features (e.g., IO features 418, 420, 422, 424) using a machine learning model (e.g., machine learning model 426).

In some implementations, ransomware detection process 10 monitors 300 for a ransomware attack on a storage object of a storage system based upon, at least in part, processing of a plurality of input/output (IO) features associated with the storage object using a machine learning model. A ransomware attack is an attack involving a type of malicious software that threatens to publish or blocks access to data or a computer system, usually by encrypting it, until the victim pays a ransom fee to the attacker. In many cases, the ransom demand comes with a deadline. If the victim does not pay in time, the data is gone forever or the ransom increases. As discussed above, ransomware attacks are becoming more and more frequent. Studies estimate that there is a ransomware attack every eleven seconds. Nevertheless, considering the vast number of IO requests that are being executed on storage systems around the world every second, a ransomware attack is a statistically rare event. The class imbalance between ransomware attacks and benign workloads likely exceeds 1:1,000,000. As such, this raises the concern of model overfitting. To reduce this risk, various machine learning techniques such as resampling (over-sampling the small class, under-sampling the large class), SMOTE (i.e., a machine learning technique that solves problems that occur when using an imbalanced data set), etc. may be used by ransomware detection process 10 within the scope of the present disclosure.

As discussed above, conventional approaches to ransomware detection are accomplished by postmortem analysis, hours or days after an attack occurs. The practical benefit of such an approach is limited since it is too late for the user or customer to take steps to block or mitigate the attack, and the damage is already done. By contrast, ransomware detection process 10 analyzes the stream of input/output (IO) operations issued from the host to the storage system (i.e., dynamic analysis), and also the resulting changes in the data that is stored (i.e., static analysis) to generate IO features. Ransomware detection process 10 uses a supervised machine learning classification model to detect ransomware attacks on storage systems as they are occurring, with high accuracy. In this manner, "real-time" or "near real-time" monitoring means monitoring and detecting ransomware attacks as they are occurring and within the time for processing the plurality of IO requests, generating the plurality of IO features, and processing the plurality of IO features using the machine learning model. In one example, ransomware detection process 10 aggregates and generates the plurality of IO features every e.g., five minutes. In this example, ransomware detection process 10 is able to monitor for potential ransomware attacks in real-time or near real-time based on the timing associated with generating the plurality of IO features during a potential ransomware attack.

As shown in FIG. 4, ransomware detection process 10 monitors 300 for a potential ransomware attack on the storage system in real-time based upon, at least in part, the processing of the plurality of IO features (e.g., IO features 418, 420, 422, 424) using the machine learning model (e.g., machine learning model 426). In some implementations, monitoring 306 for a ransomware attack on the storage system in real-time includes using the plurality of IO features (e.g., IO features 418, 420, 422, 424) to generate a ransomware attack probability score (e.g., ransomware attack probability score 428). In some implementations, ransomware attack probability score 428 is a score ranging from zero to one indicating a probability that a ransomware attack is occurring involving the storage object. In some implementations, ransomware detection process 10 uses ransomware attack probability score 428 to distinguish normal IO request workloads from potential ransomware attacks.

Figure 5:
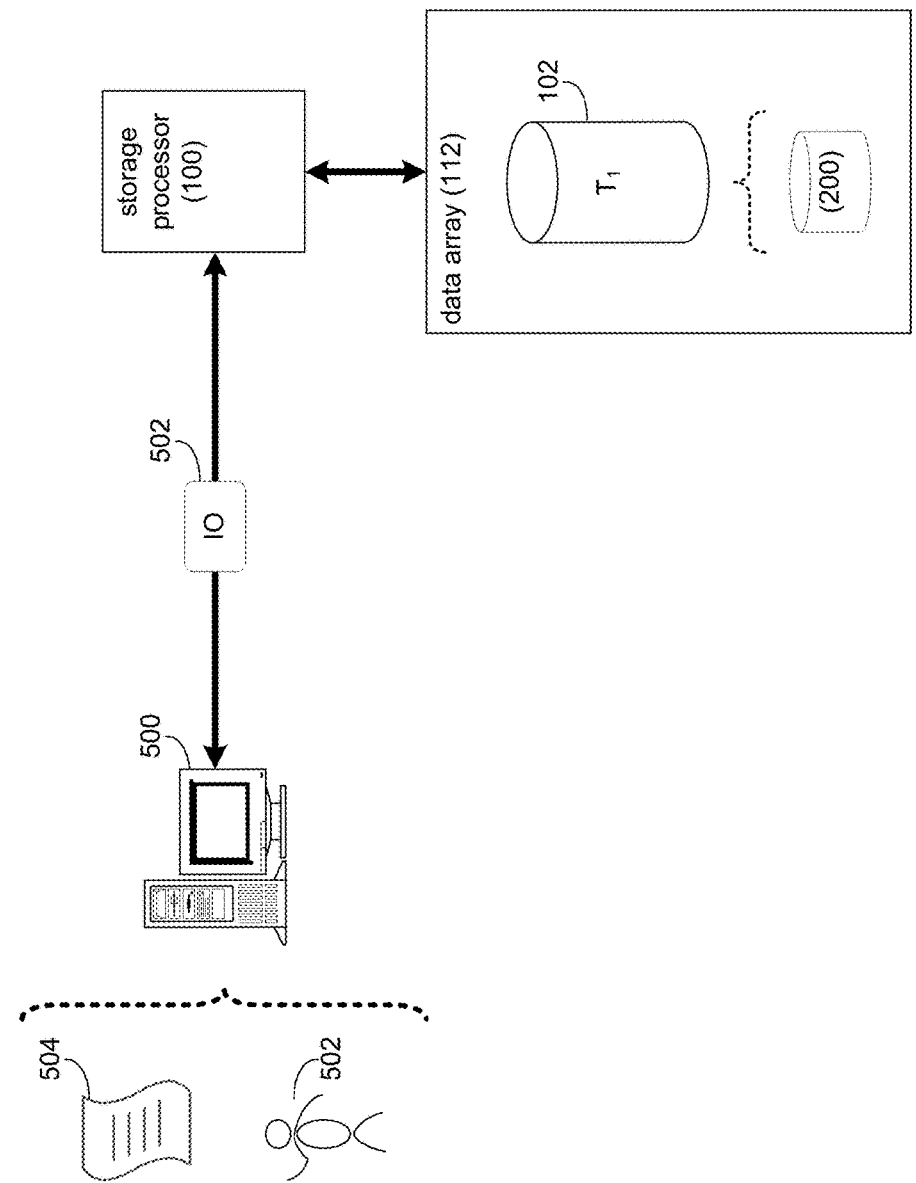
FIGS. 5-6 are example diagrammatic views of the ransomware detection process at a host-level according to one or more example implementations of the disclosure.

In some implementations, ransomware detection process 10 identifies 302 a host computing device associated with the storage object under the potential ransomware attack. A host computing device is a computing device that executes IO requests on a storage system by sending IO requests to the storage system to process data on the storage system. As shown in the example of FIG. 1, multiple host computing devices (e.g., computing devices 38, 40, 42, 44) are communicatively coupled to the storage system (e.g., storage system 12) by a network (e.g., network 14). Using network 14, IO requests (e.g., IO request 20) are communicated between host computing devices and the storage system. In response to monitoring 300 a potential ransomware attack on the storage system (e.g., based upon, at least in part, the ransomware attack probability score (e.g., ransomware attack probability score 428)). Identifying a host computing device associated with the storage object may include correlating each storage object under attack with the host machine from which the plurality of IO requests originate. Referring also to FIG. 5 and in some implementations, suppose host computing device 500 is operated by user 502. During operation of host computing device 500, ransomware detection process 10 may receive and process a plurality of IO requests (e.g., IO request 402). In this example, suppose that ransomware detection process 10 monitors 300 a potential ransomware attack based upon a plurality of IO features generated in response to at least IO request 402 (in the manner described above). Accordingly, ransomware detection process 10 identifies a host computing device (e.g., host computing device 500) associated with the IO requests associated with the potential ransomware attack (e.g., IO request 402). In some implementations, information concerning the host computing device for a particular IO request or set of IO requests is available on the storage system (e.g., storage system 12). In some implementations, ransomware detection process 10 may compare a number of IO requests from a host computing device to a predefined threshold to determine whether the host computing device is a source for the potential ransomware attack. For example, if at least a threshold number of IO requests directed to a particular storage object originate from the same host computing device, this is further evidence that a ransomware attack is occurring.

In some implementations, ransomware detection process 10 identifies 304 a process executing on the host computing device associated with the storage object under the potential ransomware attack. A process executed on a host computing device is a program or script executed on a host computing device that generates and sends IO requests from the host computing device to perform data processing operations on a storage system. In some implementations, identifying 304 a process executing on the host computing device includes correlating each storage object under attack with the specific process executing on the host computing device from which the IO requests originate. In some implementations, this mapping is obtained from a software agent running on the host computing device (e.g., Dell PowerPath™ Intelligent Multipathing Software and Dell EMC AppSync™). In some implementations, the process executing on the host computing device may be obtained when a file system is running on a block device, i.e., with SD-NAS (Software-defined Network Attached Storage).

In some implementations, identifying 304 the process executing on the host computing device includes identifying 312 a user associated with the process executing on the host computing device. For example, a user (e.g., user 502) is an individual or entity that is uniquely associated with the operation of a host computing device (e.g., host computing device 500). In some implementations, ransomware detection process 10 identifies 312 a user associated with the process executing on the host computing device by identifying user credentials associated with the host computing device. For example, host computing device 500 may include user authentication and enrollment protocols that allow a user to initiate a session with the host computing device.

In some implementations, identifying 304 the process executing on the host computing device includes identifying an executable file related to the suspected process. An executable file is the source program from the host computing device that, when executed, begins the associated process. By identifying the executable file, ransomware detection process 10 may provide more focused investigations and, as will be discussed in greater detail below, more targeted remedial actions. In some implementations, ransomware detection process 10 identifies the user, process, and executable file to determine whether the detection of a ransomware attack is accurate. For example, ransomware detection process 10 is able to determine various properties associated with the processing of the IO request on the storage object to verify or correct the indication of a ransomware attack.

In some implementations, identifying 304 the process executing on the host computing device includes determining 314 when a plurality of processes began executing on the host computing device. For example, a process that is recent (e.g., not previously executed) relative to a time threshold, is more indicative of a ransomware attack. In some implementations, the time threshold is user-defined and/or a default value. In this manner, ransomware detection process 10 may update the amount of time a process has been executing to determine whether the process is associated with a potential ransomware attack.

In some implementations, identifying 304 the process executing on the host computing device includes determining 316 a storage object access history for the identified process. A storage object access history is a record of the access to a particular storage object by a specific process. For example, a storage object that is accessed by a process before (e.g., within a predefined period of time) is indicative of a process not associated with a ransomware attack. Alternatively, recent access of a storage object indicative of reading and rewriting data to the storage object may be indicative of a ransomware attack.

In some implementations, identifying 304 the process executing on the host computing device includes determining 318 permissions associated with the user. For example, when a user has new and/or suspicious permissions (e.g., "root" permissions on a Linux® system, "admin" permissions on Windows®, etc.), this may be indicative of a ransomware attack. The particular permissions that are suspect may be user-defined and/or default values.

In some implementations, ransomware detection process 10 may determine whether storage object permissions have changed within a threshold period of time. For example, when permissions change for a particular storage object before a potential ransomware attack, this is indicative of a true ransomware attack. In some implementations, ransomware detection process 10 determines whether an executable file is new relative to a predefined threshold period of time. For example, newer executable files may be indicative of a potential ransomware attack compared to more trusted, older executable files.

In some implementations, ransomware detection process 10 performs 306 a remedial action on the storage system. For example, ransomware detection process 10 may include one or more thresholds for evaluating ransomware attack probability scores. In some implementations, the threshold(s) for particular ransomware attacks may be predefined, user-defined, and/or automatically defined using ransomware detection process 10. For example, ransomware detection process 10 may define a threshold between a false negative and a false positive (i.e., binary classification). In one example, the default threshold may be 0.5. In some implementations, ransomware detection process 10 may tune the threshold up or down for particular situations (e.g., increasing the threshold for those less willing to have a false positive or decreasing the threshold for those preferring to be alerted about all potential ransomware attacks). As discussed above, based upon, at least in part, the ransomware attack probability scores, the identified user, the identified host computing device, and/or the identified process executing on the host computing device, ransomware detection process 10 is able to determine a likelihood that a potential ransomware attack is actually a ransomware attack.

Figure 6:
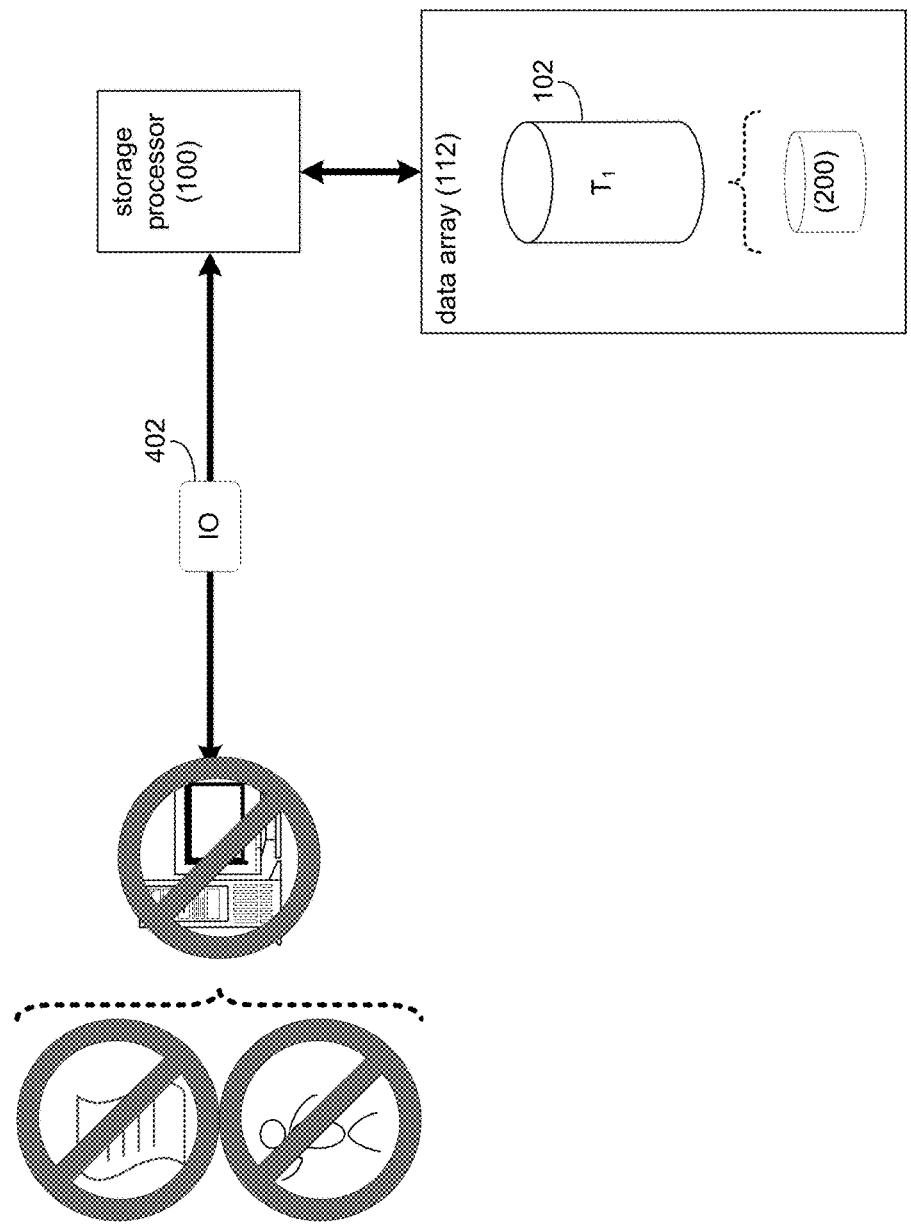

In some implementations, performing 306 the remedial action includes blocking 320 the identified process from accessing the storage object. For example, when a ransomware attack is detected with sufficient confidence (e.g., based upon, at least in part, the ransomware attack probability score), ransomware detection process 10 may block 320 the suspected process and/or the user from accessing the relevant storage objects or the entire storage system. Referring also to FIG. 6, ransomware detection process 10 may block 320 the process (e.g., process 504) by modifying the multipath rules on the host or using operating system-specific frameworks for file access control such as the fanotify API on Linux® or the Win32 access-control model on Windows®. As shown in FIG. 6, blocking 320 access is shown as the host computing device (e.g., host computing device 500) being crossed out, process 504 being crossed out, and/or user 502 being crossed out. In some implementations, any combination of the host computing device, the user, and/or the process may be blocked 320 within the scope of the present disclosure.

In some implementations, performing 306 the remedial action includes suspending one or more IO requests on the storage object and/or the storage system. For example, ransomware detection process 10 may suspend IO requests from a particular host computing device, a particular user, a specific process, and/or for IO requests directed to a specific storage object. In this example, the processing of IO requests is suspended in response to identifying a host computing device associated with the storage object under a potential ransomware attack.

In some implementations, performing 306 the remedial action includes alerting 322 one or more users concerning the monitored potential ransomware attack and the identified process. For example, the remedial action may include generating an alert (e.g., for a storage system administrator, for one or more hosts/users of the storage system, etc.). In some implementations, when the predicted risk is higher than the default, or a threshold set for a particular storage system, an alert may be issued, with all the relevant details, including the statistics of the IO patterns that triggered the alert. In some implementations, the storage system may report (e.g., to various computing devices, monitoring systems, etc.) instances of ransomware alert firing, along with detailed ransomware data, and/or feedback, indicating whether the alert was deemed correct (i.e., a true positive) or not (i.e., a false positive). Ransomware detection process 10 may also send a similar report if a user reports on a ransomware attack on the storage system that was not alerted (i.e., a false negative). In some implementations, these reports may be used tune the machine learning model to improve its accuracy.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    monitoring for a potential ransomware attack on a storage object of a storage system based upon, at least in part, processing of a plurality of input/output (IO) features associated with the storage object using a machine learning model;
    identifying a host computing device associated with the storage object under the potential ransomware attack;
    identifying a process executing on the host computing device associated with the storage object under the potential ransomware attack;
    determining whether permissions associated with the storage object have changed within a threshold period of time; and
    performing a remedial action on the storage system in response to identifying the process executing on the host computing device.

2. The computer-implemented method of claim 1, wherein monitoring for the potential ransomware attack on the storage object includes processing a plurality of IO requests associated with a plurality of storage objects of the storage system.

3. The computer-implemented method of claim 2, wherein monitoring for the potential ransomware attack on the storage object includes generating the plurality of IO features using the plurality of IO requests.

4. The computer-implemented method of claim 1, wherein identifying the process executing on the host computing device includes identifying a user associated with the process executing on the host computing device.

5. The computer-implemented method of claim 4, wherein identifying the process executing on the host computing device includes:
    determining when a plurality of processes began executing on the host computing device;
    determining a storage object access history for the identified process; and
    determining permissions associated with the user.

6. The computer-implemented method of claim 1, wherein performing the remedial action includes blocking the identified process from accessing the storage object.

7. The computer-implemented method of claim 1, wherein performing the remedial action includes alerting one or more users concerning the monitored potential ransomware attack and the identified process.

8. A computer program product residing on a non-transitory computer readable medium having a plurality of instructions stored thereon which, when executed by a processor, cause the processor to perform operations comprising:
    monitoring for a potential ransomware attack on a storage object of a storage system based upon, at least in part, processing of a plurality of input/output (IO) features associated with the storage object using a machine learning model;
    identifying a host computing device associated with the storage object under the potential ransomware attack;
    identifying a process executing on the host computing device associated with the storage object under the potential ransomware attack;

determining whether permissions associated with the storage object have changed within a threshold period of time;

and performing a remedial action on the storage system in response to identifying the process executing on the host computing device.

9. The computer program product of claim 8, wherein monitoring for the potential ransomware attack on the storage object includes processing a plurality of IO requests associated with a plurality of storage objects of the storage system.

10. The computer program product of claim 9, wherein monitoring for the potential ransomware attack on the storage object includes generating the plurality of IO features using the plurality of IO requests.

11. The computer program product of claim 8, wherein identifying the process executing on the host computing device includes identifying a user associated with the process executing on the host computing device.

12. The computer program product of claim 11, wherein identifying the process executing on the host computing device includes:

determining when a plurality of processes began executing on the host computing device;

determining a storage object access history for the identified process; and determining permissions associated with the user.

13. The computer program product of claim 8, wherein performing the remedial action includes blocking the identified process from accessing the storage object.

14. The computer program product of claim 8, wherein performing the remedial action includes alerting one or more users concerning the monitored potential ransomware attack and the identified process.

15. A computing system comprising:

a memory; and a processor configured to monitor for a potential ransomware attack on a storage object of a storage system based upon, at least in part, processing of a plurality of input/output (IO) features associated with the storage object using a machine learning model, to identify a host computing device associated with the storage object under the potential ransomware attack, to identify a process executing on the host computing device associated with the storage object under the potential ransomware attack, to determine whether permissions associated with the storage object have changed within a threshold period of time, and to perform a remedial action on the storage system in response to identifying the process executing on the host computing device.

16. The computing system of claim 15, wherein monitoring for the potential ransomware attack on the storage object includes processing a plurality of IO requests associated with a plurality of storage objects of the storage system.

17. The computing system of claim 16, wherein monitoring for the potential ransomware attack on the storage object includes generating the plurality of IO features using the plurality of IO requests.

18. The computing system of claim 15, wherein identifying the process executing on the host computing device includes identifying a user associated with the process executing on the host computing device.

19. The computing system of claim 18, wherein identifying the process executing on the host computing device includes:

determining when a plurality of processes began executing on the host computing device;

determining a storage object access history for the identified process; and determining permissions associated with the user.

20. The computing system of claim 15, wherein performing the remedial action includes blocking the identified process from accessing the storage object.

* * * * *